Dec. 22, 1970    T. GOLDSTEIN    3,548,425
ABUTMENT INTERLOCK MECHANISM
Filed May 1, 1968
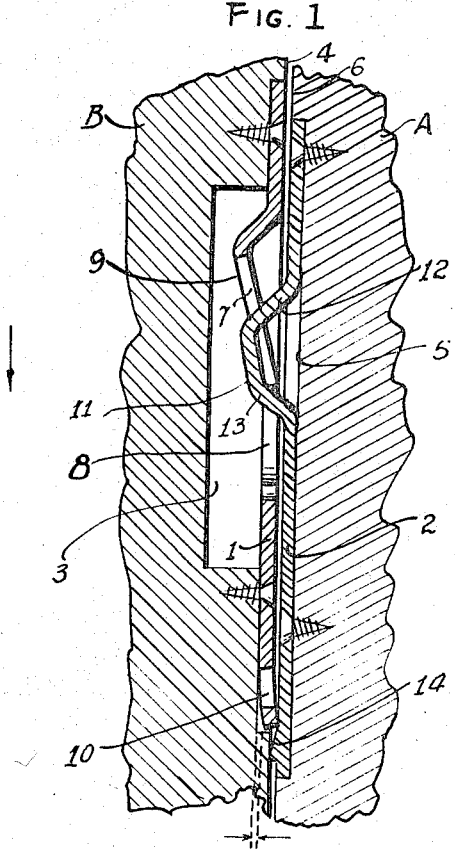
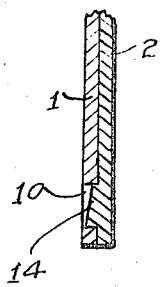
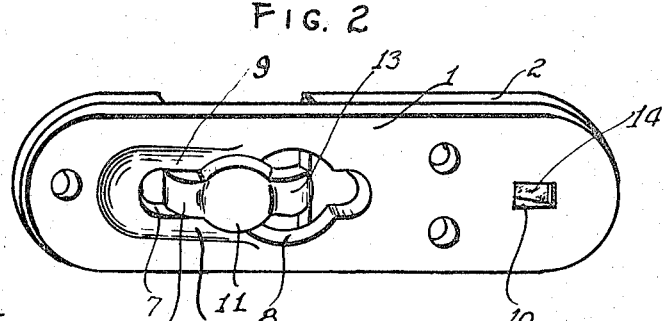
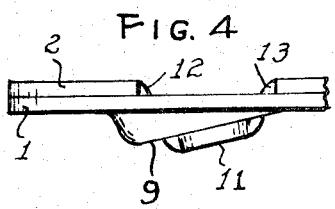
INVENTOR
TOBY GOLDSTEIN
BY: Ben V. Zillman
ATTORNEY

United States Patent Office 3,548,425
Patented Dec. 22, 1970

3,548,425
ABUTMENT INTERLOCK MECHANISM
Toby Goldstein, 11 Ladue Estates, St. Louis, Mo. 63141
Filed May 1, 1968, Ser. No. 725,813
Int. Cl. A47b *47/00;* A47c *19/00*
U.S. Cl. 5—299     5 Claims

ABSTRACT OF THE DISCLOSURE

The object of this invention is to provide a connector mechanism for joining cooperating members into an intended structural relationship as an integral unit. This joining is preferably done at the final point of delivery of the structural unit, as for instance, of a head-board of a bed, usually in the home of the ultimate buyer.

The separate members may thus be stored, shipped, and otherwise handled as separate pieces, with little or no portions of the interlock projecting therefrom, that might otherwise be objectionable and interfere with ready handling.

BACKGROUND OF THE INVENTION

(1) Field of the invention

The invention relates to the assembling of mating members, as for example, of the component pieces of a bed head-board, into a structural operating unit, for instance, the transverse main member of the head-board with a pair of side or upright members, to thereby minimize the difficulties in shipping, storing and delivery of the individual components, and all done without the necessity of the glueing operation customarily done at the factory, for uniting said pieces, before shipping from the factory.

(2) Description of the prior art

The component parts of the head-board, for example, are provided with a transverse member, to cooperate with a pair of side or upright members, and it is customary to glue said members together at the factory, into a structural unit, thus making the assembled unit much more difficult to handle, than if the pieces were separate parts.

SUMMARY

The instant invention solves the foregoing problems, by providing one element of the interlock mechanism to each of the members that are to be joined to one another into abutment relation, and these elements project but a minimum distance from the faces of the members to which they are attached, thus substantially not interfering with normal handling operations of the individual members.

The invention has among its objects to provide such an interlock, wherein the members are permanently interlocked into an integral unit at any desired point, in commerce, as for example in either the showroom or in the home of the point of delivery, by the simple sliding movement of one of said members relatively of the other.

Another object of the invention is to so shape said interlocking means that they will automatically properly engage one another in a simple assembling operation, to thereby lock said members into a permanently immovable relation and in the desired tight abutted relation.

BRIEF DESCRIPTION OF THE DRAWINGS

FIG. 1 is a longitudinal cross-sectional view through the pair of cooperating members, about to start into their assembled relation;

FIG. 2 is a perspective view of the locking elements in final interlocked position;

FIG. 3 is a fragmentary detail of the relative positions of the elements at the end of locking relation; and FIG. 4 is a fragmentary side view detail, showing final camming position of the parts of the device.

DESCRIPTION OF THE PREFERRED EMBODIMENT

In the drawings there is shown fragmentary portions of two cooperating parts of a structural unit that is to be formed by interlocking them into relative abutment, as for example, the transverse member A with a pair of end pieces or uprights B (one of which is shown), to complete the head-board.

One of the main objects of the invention is to make said abutment juncture quite tight, and without the necessity of any glueing operation.

The connector mechanism consists of two elements, 1 and 2 respectively, each preferably made of a flat metal strip, one element 1 to be secured within a recess 3 into an edge 4 of the member B, and the other element 2 to be secured similarly within a recess 5 in the side edge 6 of the mating member A.

Said element 1 has a longitudinal slot medially therethrough, as at 7, said slot preferably enlarged intermediate its ends to form the opening 8. A pair of angularly directed camming portions 9—9 are struck up from one face of the strip to extend longitudinally away from said opening toward the other end of the element.

At the lower end of the element 1 and medially thereof, there is a small aperture 10, which in this case extends entirely through the strip, and said lower end may be sprung very slightly outward of the recess, as indicated by the dotted lines in FIG. 1, this amount of spring not normally interfering with the normal handling of the member, and as a matter of fact, the spring will be entirely taken up, when the members are brought into their final locked position, as will be more fully explained.

The element 2 has a button 11 struck up from the strip, of a size and shape to readily pass through the enlarged opening 8 of the element 1, as indicated in FIGS. 1 and 2, with legs 12–13 connecting the button with the base portion of the strip, these legs being sufficiently narrower than the diameter of the button and of a width slightly less than the slot width, whereby said button will ride at its side portions that overhang the side edges of the legs, on the pair of camming portions 9—9, and for this purpose one of the legs is shorter than the other so that the button lies in substantially the same angle or inclined plane as that of the inclined planes that form the camming portions 9—9 (see FIGS. 1, 2, and 4).

A tooth, prong, or pin 14 is located to extend from the lower end of the strip 2, medially of the latter, with its lowermost terminal edge preferably perpendicular to the adjacent face of the strip, so as to snap into the aperture 10 as said elements are actuated into cammed interlock.

After the elements have been properly mounted in the recesses of the members A and B, and with said members arranged adjacent one another so that said elements are oposed, one of the members, as for instance the member B, may be actuated downwardly relative to the other member, as indicated by the larger arrow in FIG. 1, and with the button passed through the enlarged opening into the slot, continued downward movement causes the overhanging side portions of the button to ride upwardly on the pair of camming inclined planes, such action drawing the elements closer toward one another until the projection 14 snaps into the aperture 10, the slight spring of the lower end of the element 1 aiding in such action, and thereafter holding said elements permanently interlocked, making it practically impossible to detach one of said members from the other without damaging or destroying the parts.

As the camming increases, the spring lower end of the element 1 is forced to straighten out to be substantially flush with the adjacent edge of the member B, and the members thus brought into a good and tight abutment.

The locating of the pin 14 and aperture 10, in the median of the strips will hold the elements in alignment and prevent any possibility of swing or pivoting of one member relatively of the other. Also, in the event that the abutting edges of the cooperating members are of the same thickness, such medial placement, plus the wedging action of the button, will maintain them so, without danger of one member getting out of its flush relation with the other member.

What is claimed is:

1. In a device for interlocking a pair of cooperating members substantially into abutment as an integral unit, first and second elongated flat-metal strip elements that are to be secured respectively to the opposed faces of said members, said first element having an intermediate button portion lying in an inclined plane protruding from one face of said element, said second element having an inclined plane portion protruding from one of its faces, there being a slot through said inclined plane portion of said second element to permit said button to pass therethrough to slidably ride along said last-mentioned inclined plane portion, to additionally wedge said elements together horizontally as the same are actuated relatively longitudinally of one another into their normal operative position.

2. A device as set forth in claim 1, further characterized in that there is an enlarged opening through said second element, larger than the width of said slot to communicate with the latter to initially receive said button before entry of the latter into said slot.

3. A device as set forth in claim 1, further characterized in that said first element has a pair of legs connected to the respective ends of said button, with said legs being narrower than the width of said button so that the side portions of said button overhang the side edges of said legs and will cam against the said inclined plane portions of the second element of said elements are actuated relatively longitudinally of one another.

4. A device as set forth in claim 1, further characterized in that there is a pin projecting from the face of one of said elements adjacent its lower end and along its median, and that there is an aperture through the lower end of the other element, of such size and shape to permit said pin to snap thereinto as said pin and aperture move toward one another and into registry upon relative longitudinal actuation of said elements.

5. A device as set forth in claim 4, further characterized in that said pin is tapered with the highest, outwardly protruding point is at its lowermost terminous, and said lower terminal end of said second-mentioned element being slightly offset toward said pin so that it is temporarily flexed by its engagement by said pin.

References Cited

UNITED STATES PATENTS

| | | | |
|---|---|---|---|
| 714,733 | 12/1902 | Newell | 5—300 |
| 1,341,068 | 5/1920 | Okun | 5—299 |
| 1,736,878 | 11/1929 | Duvall | 5—299 |

CASMIR A. NUNBERG, Primary Examiner

U.S. Cl. X.R.

312—263